(12) United States Patent
Yang

(10) Patent No.: US 11,549,479 B1
(45) Date of Patent: Jan. 10, 2023

(54) MINIATURE HYDROELECTRIC APPARATUS

(71) Applicant: TI YANG CO., LTD., Taichung (TW)

(72) Inventor: Hung-Yuan Yang, Taichung (TW)

(73) Assignee: TI YANG CO., LTD., Taichung (TW)

( * ) Notice: Subject to any disclaimer, the term of this patent is extended or adjusted under 35 U.S.C. 154(b) by 0 days.

(21) Appl. No.: 17/510,382

(22) Filed: Oct. 26, 2021

(51) Int. Cl.
*F03B 13/00* (2006.01)
*F03B 13/12* (2006.01)
*H02K 7/18* (2006.01)
*F03B 3/12* (2006.01)

(52) U.S. Cl.
CPC ............... *F03B 13/00* (2013.01); *F03B 3/12* (2013.01); *H02K 7/1823* (2013.01); *F05B 2220/706* (2013.01); *F05B 2240/60* (2013.01)

(58) Field of Classification Search
CPC ......... F03B 13/00; F03B 3/12; H02K 7/1823; F05B 2220/706; F05B 2240/60
See application file for complete search history.

(56) References Cited

U.S. PATENT DOCUMENTS

| | | | | |
|---|---|---|---|---|
| 3,818,704 A | * | 6/1974 | Lapeyre | F03B 13/16 60/504 |
| 4,412,417 A | * | 11/1983 | Dementhon | F03B 13/183 416/85 |
| 6,616,402 B2 | * | 9/2003 | Selsam | F03D 1/025 415/3.1 |
| 9,133,815 B1 | * | 9/2015 | Hench | F03B 13/264 |
| 9,279,407 B2 | * | 3/2016 | Sinclaire | E02B 9/08 |
| 11,067,055 B2 | * | 7/2021 | Saiz | F03B 13/10 |
| 2006/0233635 A1 | * | 10/2006 | Selsam | F03D 15/20 415/4.3 |
| 2013/0147199 A1 | * | 6/2013 | Zambrano | F03B 13/264 416/85 |

* cited by examiner

*Primary Examiner* — Joseph Ortega
(74) *Attorney, Agent, or Firm* — Bruce Stone LLP; Joseph A. Bruce

(57) ABSTRACT

A hydroelectric apparatus includes multiple propellers to be driven by a hydraulic current, a generating module and a transmission arranged between the propellors and the generating module. Thus, the rotation of the propellors is convertible into electricity. The transmission is used to change a rotational speed of the set of propellers. The propellors are able to float on water in a canal without affecting the performance of the canal. The number of the propellors is large to produce a large torque to increase the power of the hydroelectric apparatus so that the electricity can be supplied to the public. Moreover, the small size of the hydroelectric apparatus renders the hydroelectric apparatus inexpensive and environmentally friendly.

8 Claims, 7 Drawing Sheets

MINIATURE HYDROELECTRIC APPARATUS

BACKGROUND OF INVENTION

1. Field of Invention

The present invention relates to a hydroelectric apparatus and, more particularly, to a miniature hydroelectric generator.

2. Related Prior Art

A hydropower plant is often constructed with a dam extending across a river. The hydropower plant includes a turbine rotated by a strong hydraulic current leaving the dam and a generating module for converting the rotation of the turbine into electricity.

Generation of electricity by a hydropower plant is expected to be sustainable and hence environmentally friendly. As mentioned above, a hydropower plant is often used with a dam that suppresses floods, improves voyage and facilitates irrigation in addition to the generation of electricity. However, the construction of a dam inevitably produces a lot of methane that is not environmentally friendly.

The present invention is therefore intended to obviate or at least alleviate the problems encountered in the prior art.

SUMMARY OF INVENTION

It is an objective of the present invention to provide a hydroelectric apparatus for use in a canal without affecting the performance of the canal.

It is another objective of the present invention to provide an environmentally friendly hydroelectric apparatus.

To achieve the foregoing objectives, the hydroelectric apparatus includes multiple propellors, a generating module and a transmission. In use, the propellors are rotated by a hydraulic current. The generating module converts the rotation of the propellors into electricity. The transmission connects the propellors to the generating module.

Other objectives, advantages and features of the present invention will be apparent from the following description referring to the attached drawings.

BRIEF DESCRIPTION OF DRAWINGS

The present invention will be described via detailed illustration of three embodiments referring to the drawings wherein.

DETAILED DESCRIPTION OF EMBODIMENTS

Figure 1:
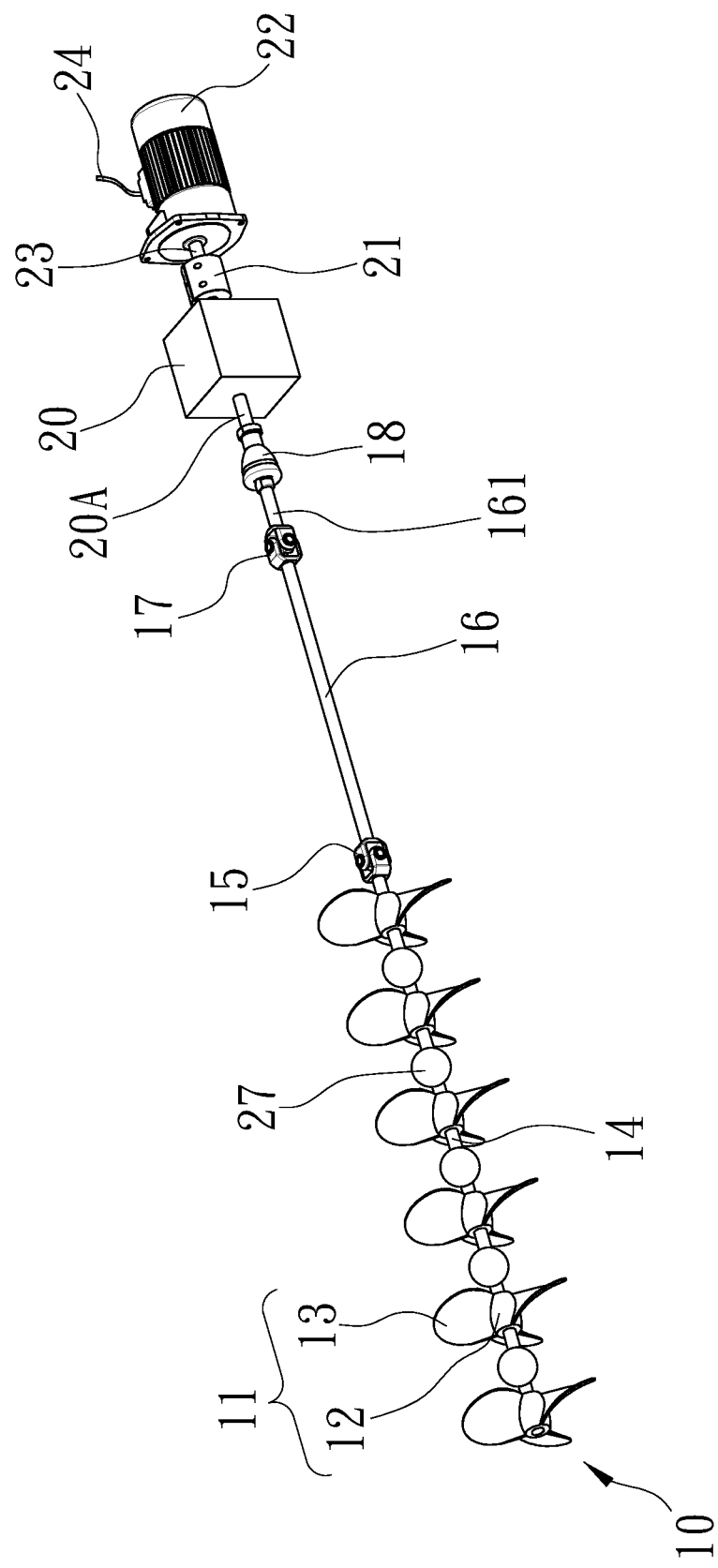
FIG. 1 is a perspective view of a hydroelectric apparatus according to the first embodiment of the present invention.
Figure 2:
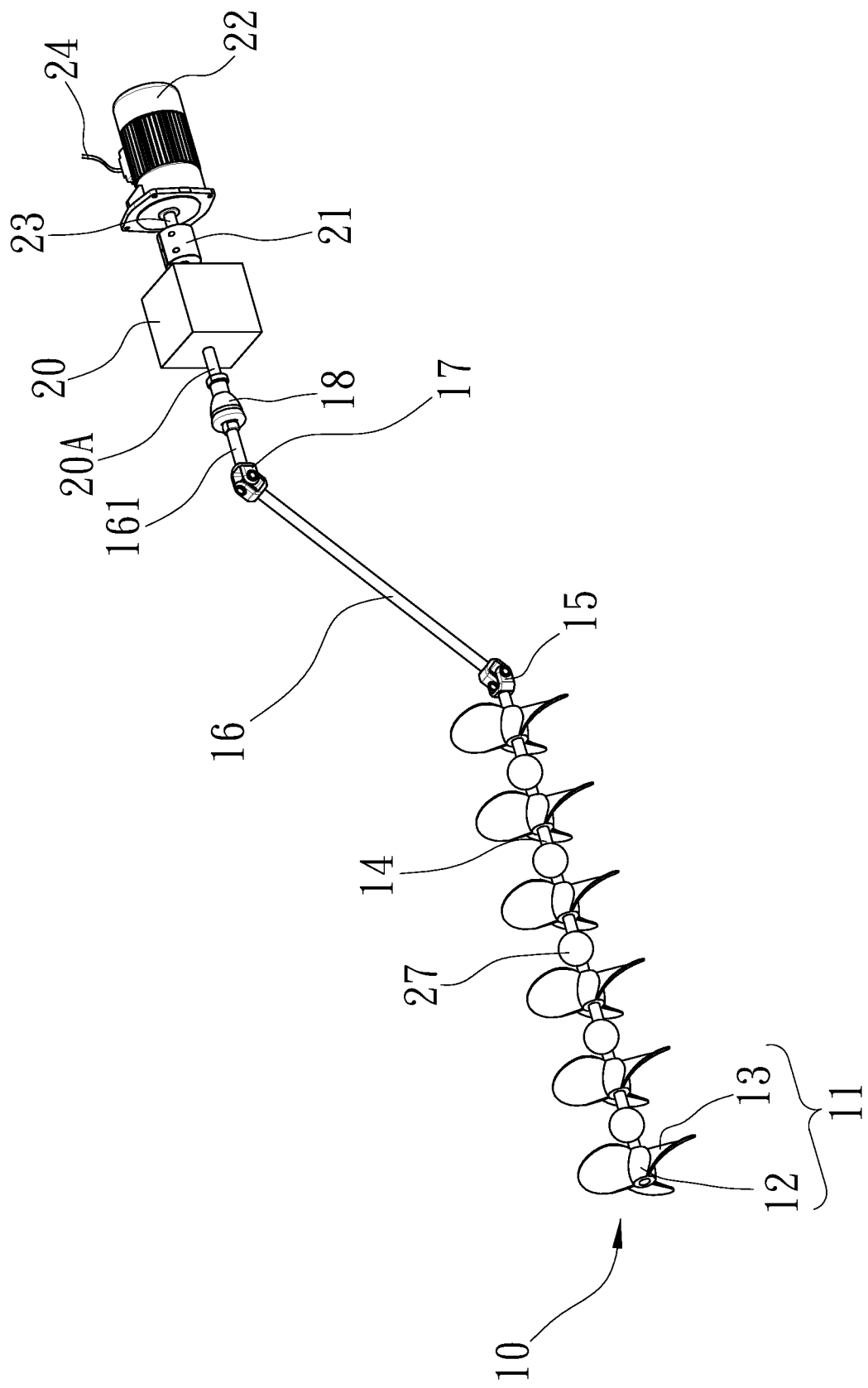
FIG. 2 is a perspective view of the hydroelectric apparatus in another position than shown in FIG. 1.

Referring to FIGS. 1 and 2, a hydroelectric apparatus 10 includes multiple propellors 11, a common shaft 14, universal joints 15 and 17, a long axle 16, a short axle 161, a joint bearing 18, a transmission 20, a connector 21 and a generating module 22 according to a first embodiment of the present invention.

Each of the propellors 11 includes three blades 13 extending from a hub 12 located around and connected to the common shaft 14 so that the propellors 11 are rotatable with the common shaft 14 synchronously. The universal joint 15 connects the long axle 16 to the common shaft 14. The universal joint 17 connects the long axle 16 to the short axle 161. Thus, the common shaft 14, the long axle 16 and the short axle 161 are not rotatable relative to one another in an axial direction while they are allowed to pivot relative to one another. The transmission 20 is preferably a gear box including an input shaft 20A (FIG. 4, not numbered) extending from an end of the transmission 20 and an output shaft 20B extending from an opposite end of the transmission 20.

The input shaft 20A is connected to the short axle 161 via the joint bearing 18. The output shaft 20B is connected to a mandrel 23 of the generating module 22 through the connector 21. A power cable 24 is electrically connected to the generating module 22.

In operation, the generating module 22, the connector 21, the transmission 20, the joint bearing 18 and the short axle 161 are arranged along a same line. The long axle 16 is slant. There is an obtuse angle between the short axle 161 and the long axle 16. There is another obtuse angle between the long axle 16 and the common shaft 14. Thus, the common shaft 14 extends substantially parallel to the mandrel 23 of the generating module 22. The common shaft 14, which supports the propellors 11, rotates the mandrel 23 of the transmission 20. The transmission 20 changes the rotational speed of the short axle 161 to the rotational speed of the mandrel 23. That is, the transmission 20 changes the torque in the short axle 161 to the torque in the mandrel 23. Thus, the torque in the mandrel 23 is suitable for the generating module 22 to generate electricity. The electricity generated by the generating module 22 is transmitted to an external device via the power cable 24.

Figure 3:
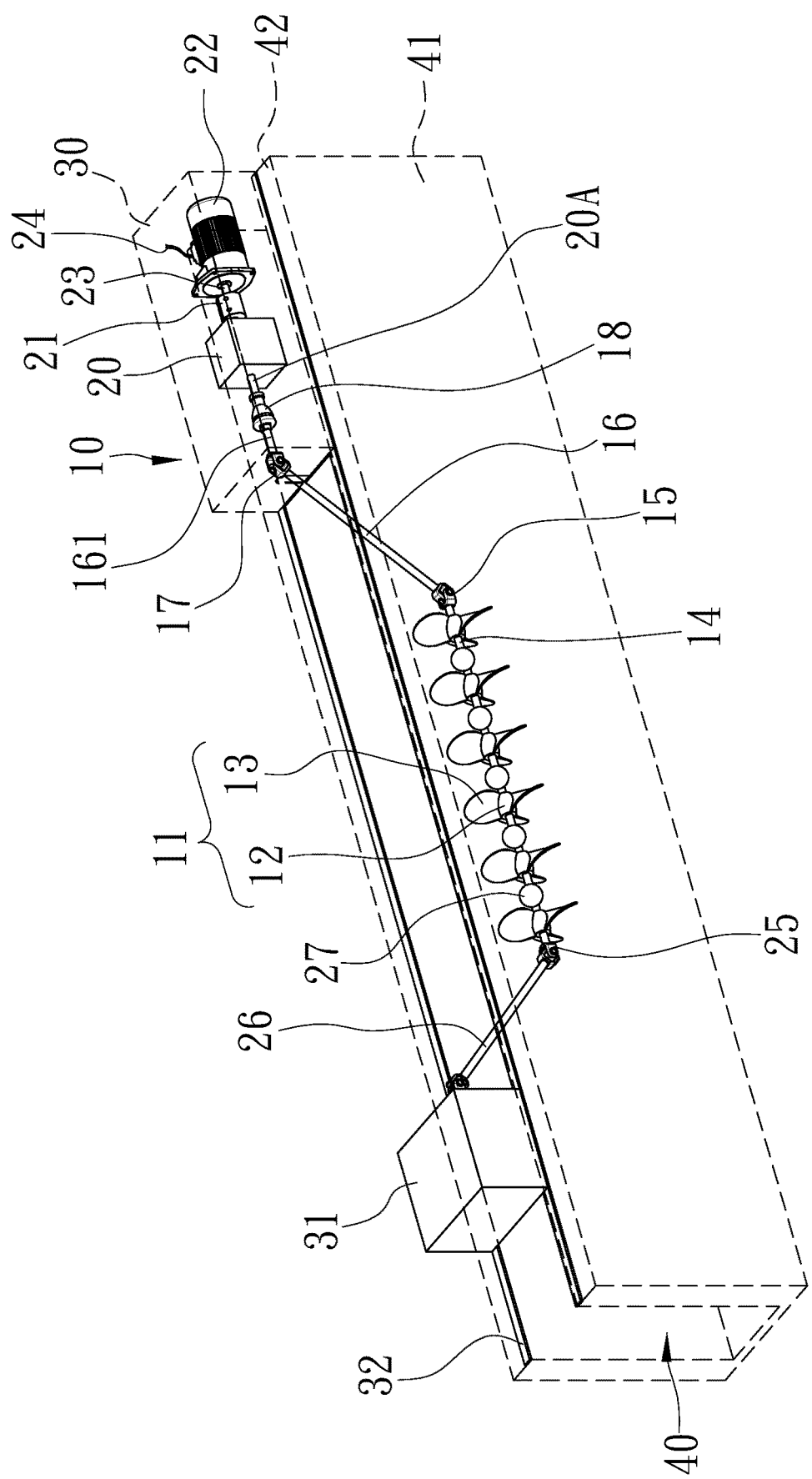
FIG. 3 is a perspective view of a hydroelectric apparatus according to the second embodiment of the present invention.

At least one buoy 27 is connected to the common shaft 14 so that the propellors 11 floats on the surface of water in a canal 40 (FIG. 3). The travel of the water in the canal and hence the performance of the canal 40 are not considerably affected by the propellors 11, which are supported on the common shaft 14, which is supported by the buoy 27.

The transmission 20 renders the torque in the mandrel 23 of the generating module 22 than the torque in the common shaft 14. Such a higher torque increases the power of the generation of electricity by the generating module 22. Moreover, the miniature hydroelectric apparatus 10 requires only a low cost and is environmentally friendly.

Figure 4:
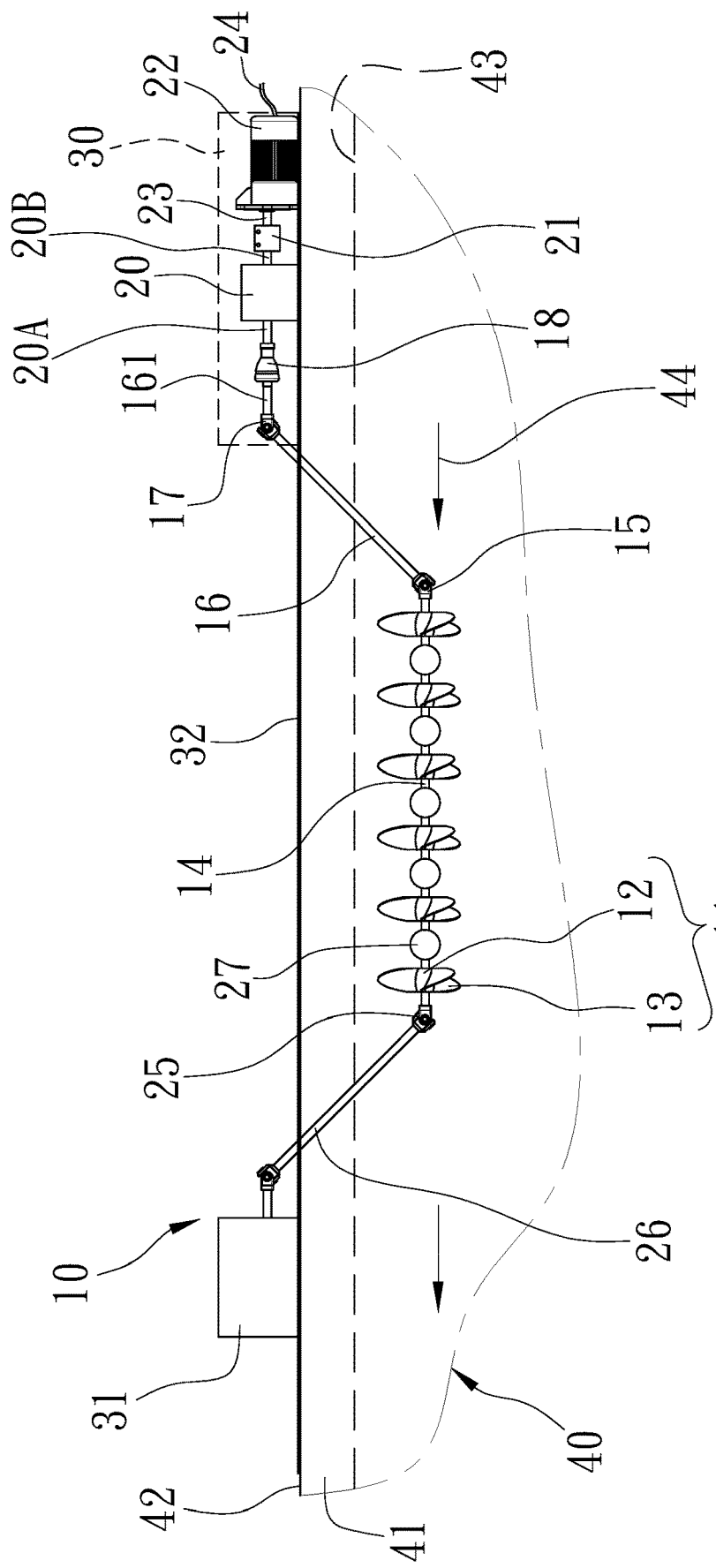
FIG. 4 is a front view of the hydroelectric apparatus shown in FIG. 3.

Referring to FIGS. 3 and 4, there is shown a hydroelectric apparatus 10 according to a second embodiment of the present invention. The second embodiment is identical to the first embodiment except for several features.

Firstly, the hydroelectric apparatus 10 includes an additional primary box 30. The primary box 30 covers and hence protects the generating module 22, the connector 21, the transmission 20, the joint bearing 18, the short axle 161 and at least a section of the long axle 16. The primary box 30 includes a slot (not numbered) to allow the long axle 16 to pivot in and along the slot.

Secondly, the hydroelectric apparatus 10 includes two additional tracks 32 for supporting the primary box 30. The tracks 32 extend longer than the primary box 30. Preferably, the primary box 30 are not movable relative to the tracks 32.

Thirdly, the hydroelectric apparatus 10 includes an additional secondary box 31 movable on and along the tracks 32 relative to the primary box 30. The secondary box 31 is pivotally connected to an additional long axle 26 via an additional universal joint (not numbered). The long axle 26 is pivotally connected to the common shaft 14 via an additional universal joint 25. Thus, two ends of the common shaft 14 are pivotally connected to the long axles 16 and 26, respectively. The secondary box 31 is movable relative to the primary box 30 to allow the propellors 11 to be located on a surface of water lower than tops of the tracks 32, which support the primary box 30.

For example, the hydroelectric apparatus 10 is used in vicinity of a canal 40. Each of the tracks 32 extends on and along a top 42 of a wall 41 of the canal 40. Manually, electrically or automatically, the secondary box 31 is moved toward the primary box 30 along the tracks 32. The long axles 16 and 26 support the common shaft 14 and the propellors 11 while the propellors 11 descend to a surface 43 of water in the canal 40.

Referring to FIG. 4, as indicated by two arrow heads (not numbered), a hydraulic current 44 travels in and along the canal 40 and goes past the propellors 11. The propellors 11 rotate the common shaft 14 due to the connection of the hubs 12 to the common shaft 14. The long axle 26 is rotatable relative to the secondary box 31 so that secondary box 31 does not affect the rotation of the common shaft 14 considerably. According to a predetermined ratio, the transmission 20 changes the rotational speed of the common shaft 14 to the rotational speed of the mandrel 23. The generating module 22 generates electricity and transmits the electricity to an external device via the power cable 24.

Figure 5:
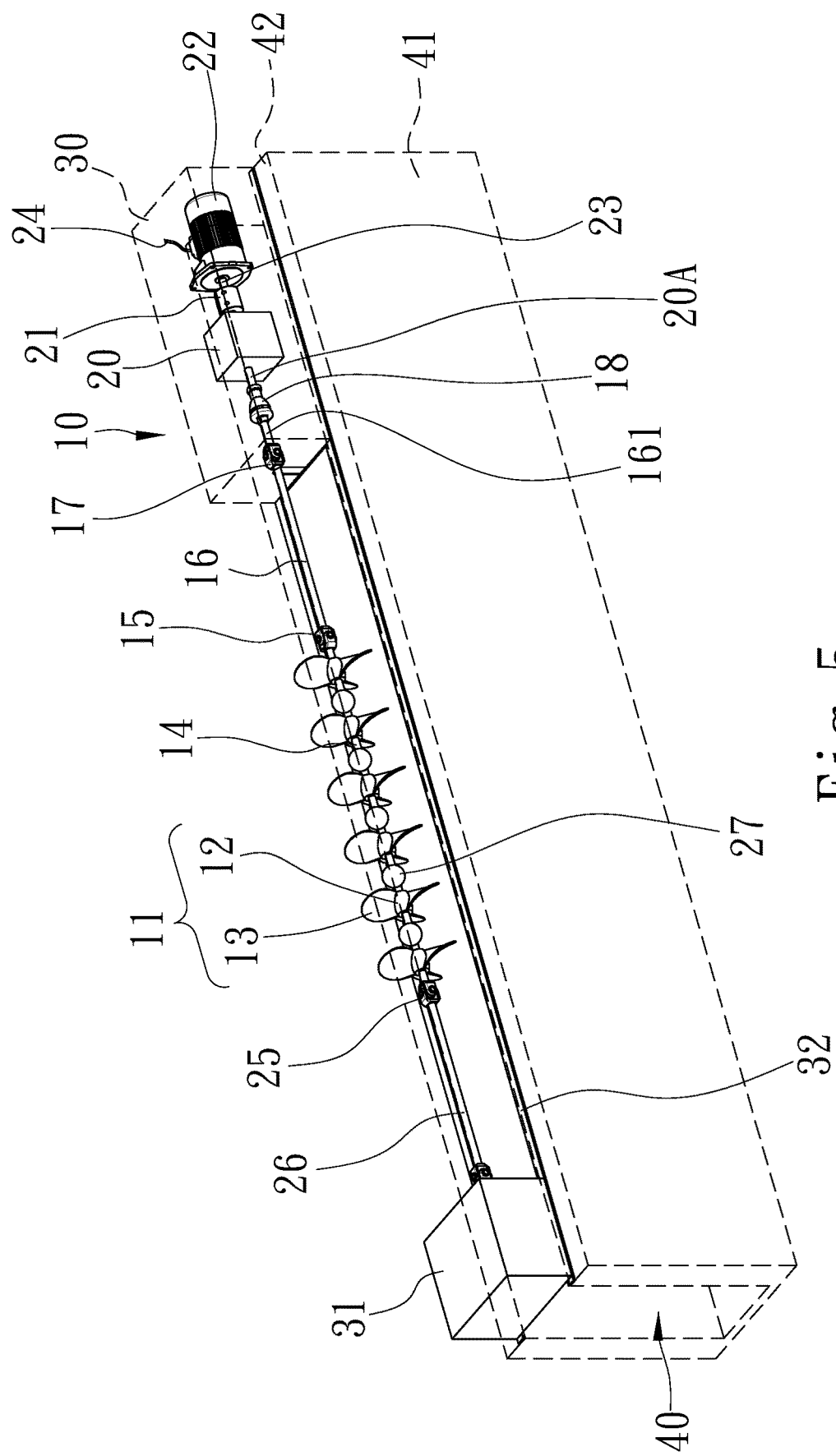
FIG. 5 is a perspective view of the hydroelectric apparatus in another position than shown in FIG. 3.
Figure 6:
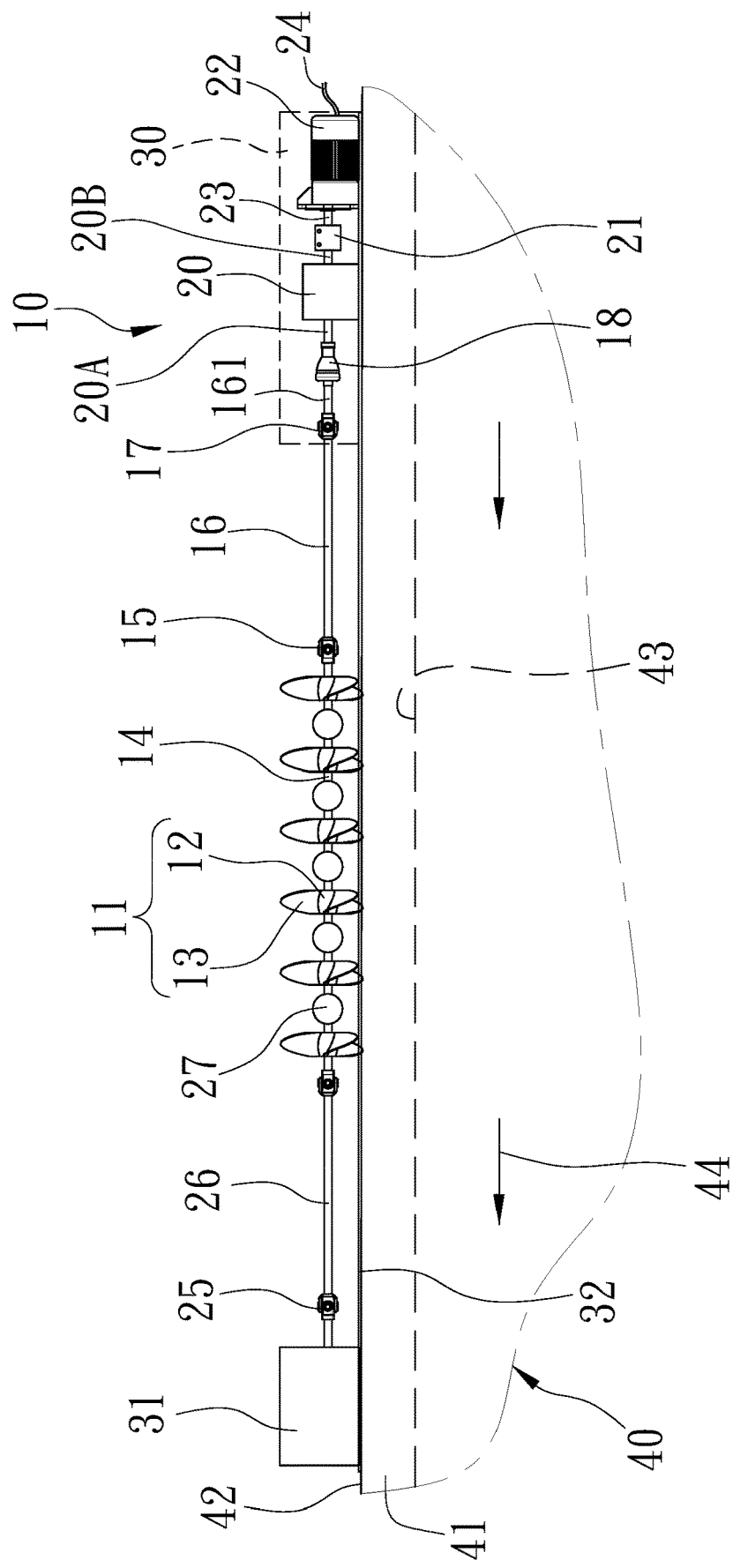
FIG. 6 is a front view of the hydroelectric apparatus shown in FIG. 5.

Referring to FIGS. 5 and 6, the secondary box 31 is moved from the primary box 30 along the tracks 32. Thus, the long axle 26, the common shaft 14 and the long axle 16 extend substantially along a straight line. Hence, the propellors 11 are hung over the surface 43 of water, i.e., away from the hydraulic current 44. The hydroelectric apparatus 10 stops generating electricity although the hydraulic current 44 continues to travel in and along the canal 40.

Figure 7:
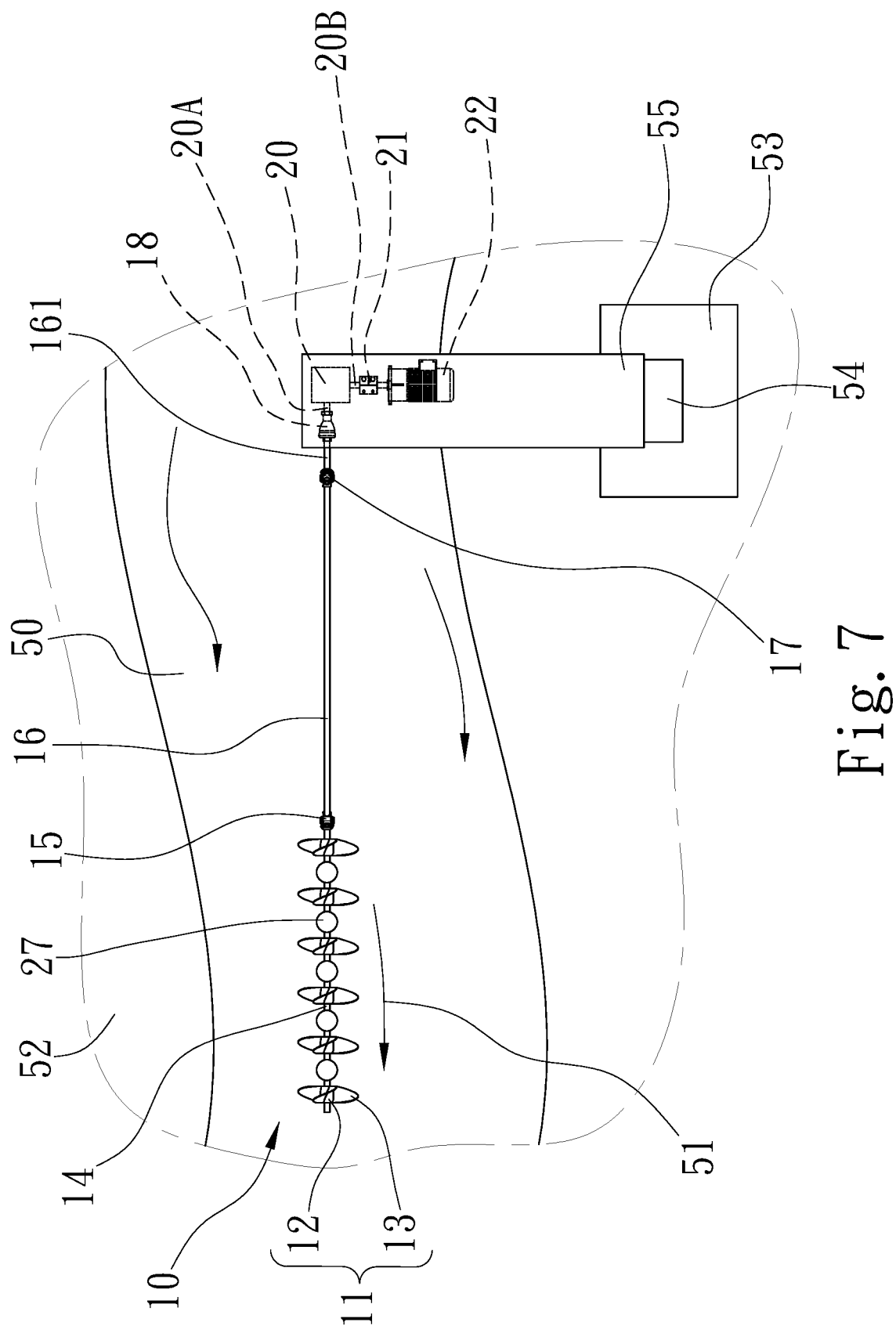
FIG. 7 is a partial front view of a hydroelectric apparatus according to the third embodiment of the present invention.

Referring to FIG. 7, there is a hydroelectric apparatus 10 according to a third embodiment of the present invention. The third embodiment is identical to the first embodiment except for several features. Firstly, the hydroelectric apparatus 10 includes an additional rocker 55 for containing the generating module 22, the connector 21, the transmission 20 and the joint bearing 18.

Secondly, the hydroelectric apparatus 10 includes an additional foundation 53 formed with a protuberance 54 for supporting the rocker 55.

In use, the foundation 53 is kept in position on a bank 52. The rocker 55 pivots toward a river 50 extending by the bank 52. The short axle 161 and long axle 16 support the common shaft 14 while the propellors 11 descend to the river 50. As indicated by arrow heads (not numbered), a hydraulic current 51 travels past the propellors 11 and hence rotates the propellors and the common shaft 14. As the transmission 20 is arranged between the common shaft 14 and the generating module 22, the generating module 22 is allowed to generate electricity at a proper power.

The present invention has been described via the illustration of the embodiments. Those skilled in the art can derive variations from the embodiments without departing from the scope of the present invention. Therefore, the embodiments shall not limit the scope of the present invention defined in the claims.

The invention claimed is:

1. A hydroelectric apparatus comprising:
   multiple propellors to be rotated by a hydraulic current;
   a common shaft for supporting the propellors so that the common shaft is rotatable with the propellors;
   a generating module for converting the rotation of the propellors into electricity, wherein the generating module comprises a mandrel;
   a transmission for connecting the propellors to the generating module, wherein the transmission comprises an input shaft connected to the common shaft and an output shaft connected to the mandrel;
   a first long axle pivotally connected to the common shaft; and
   a short axle comprising a first end pivotally connected to the first long axle and a second end connected to the input shaft of the transmission.

2. The hydroelectric apparatus according to claim 1, comprising:
   a first universal joint for connecting the first long axle to the common shaft;
   a second universal joint for connecting the first end of the short axle to the first long axle;
   a joint bearing for connecting the second end of the short axle to the input shaft of the transmission; and
   a connector for connecting the output shaft of the transmission to the mandrel of the generating module.

3. The hydroelectric apparatus according to claim 2, comprising a primary box for covering the generating module, the transmission, the joint bearing and short axle.

4. The hydroelectric apparatus according to claim 3, comprising two tracks for supporting the primary box.

5. The hydroelectric apparatus according to claim 4, comprising:
   a secondary box movable on and along the tracks relative to the primary box;
   a second long axle pivotally connected to the secondary box; and
   a third universal joint for connecting the second long axle to the common shaft.

6. The hydroelectric apparatus according to claim 1, comprising:
   a rocker for covering the generating module and the short axle; and
   a foundation pivotally connected to the rocker.

7. The hydroelectric apparatus according to claim 6, wherein the foundation comprises a protuberance pivotally connected to the rocker.

8. The hydroelectric apparatus according to claim 1, comprising at least one buoy connected to the common shaft.

* * * * *